US011910753B2

(12) United States Patent  
Arnold et al.

(10) Patent No.: US 11,910,753 B2  
(45) Date of Patent: Feb. 27, 2024

(54) HARVEST ACCESSORY FOR A TRACTOR MOUNTED WORK PLATFORM

(71) Applicants: Richard Arnold, Peru, NY (US); Nicholas Arnold, Peru, NY (US)

(72) Inventors: Richard Arnold, Peru, NY (US); Nicholas Arnold, Peru, NY (US)

( * ) Notice: Subject to any disclaimer, the term of this patent is extended or adjusted under 35 U.S.C. 154(b) by 1023 days.

(21) Appl. No.: 16/815,728

(22) Filed: Mar. 11, 2020

(65) Prior Publication Data

US 2020/0205346 A1    Jul. 2, 2020

Related U.S. Application Data

(63) Continuation-in-part of application No. 15/763,874, filed as application No. PCT/US2017/066627 on Dec. 15, 2017, now Pat. No. 10,589,971.

(60) Provisional application No. 62/434,520, filed on Dec. 15, 2016.

(51) Int. Cl.  
*A01D 90/10* (2006.01)  
*A01D 46/20* (2006.01)

(52) U.S. Cl.  
CPC ............ *A01D 90/10* (2013.01); *A01D 46/20* (2013.01)

(58) Field of Classification Search  
CPC ........ A01D 90/10; A01D 46/20; A01D 91/04; B66F 11/04; B66F 17/006; B62D 5/04; B62D 15/025; G05D 1/0278; A01B 51/00; A01B 73/00; A01G 3/08  
USPC ........................................... 414/540; 53/291  
See application file for complete search history.

(56) References Cited

U.S. PATENT DOCUMENTS

| 1,271,845 | A   | 7/1918 | Bryant |
| 2,825,573 | A * | 3/1958 | Shaw ................... A01B 75/00 414/508 |
| 3,633,336 | A * | 1/1972 | Rempel ................. A01D 46/20 53/391 |
| 3,690,092 | A * | 9/1972 | Ross .................... A01D 46/20 53/391 |
| 4,512,687 | A   | 4/1985 | Silvanus |
| 7,882,686 | B2* | 2/2011 | Bryan, Jr. ............ A01D 46/243 56/13.1 |
| 8,132,659 | B2  | 3/2012 | Coers et al. |

FOREIGN PATENT DOCUMENTS

| AU | 767785 B2 | 7/2001 |
| CA | 858189 A  | 12/1970 |
| EP | 3324728 B1 | 5/2019 |

* cited by examiner

*Primary Examiner* — Lynn E Schwenning  
(74) *Attorney, Agent, or Firm* — Downs Rachlin Martin PLLC

(57) ABSTRACT

A working platform that can be removably attached to a front portion of a utility tractor is provided in which the platform is at least horizontally adjustable, is sized to allow a user to move about on the platform, and the tractor can be controlled by a user with controls located on the platform. In addition, an automatic steering system may be included that allows the tractor to remain generally along a preselected course, such as between rows of trees or other objects. As the tractor moves down the row of an orchard, the platform can be adjusted so as to be in an appropriate position for performing work on the tree. A harvesting accessory system may also be attached to the tractor in conjunction with the working platforms, which supports and conveys bins from the tractor to the ground.

11 Claims, 16 Drawing Sheets

HARVEST ACCESSORY FOR A TRACTOR MOUNTED WORK PLATFORM

RELATED APPLICATION DATA

This application is a continuation-in-part of U.S. application Ser. No. 15/763,874, filed Mar. 28, 2018 and which is a National Stage Application of PCT/US 17/66627, which was filed Dec. 15, 2017 and which claims the benefit of priority of U.S. Provisional Application No. 62/434,520, filed Dec. 15, 2016, and titled "Working Platform for a Tractor," each of which is incorporated by reference herein in its entirety.

FIELD OF THE INVENTION

The present invention generally relates to accessories for tractors. In particular, the present invention is directed to a Harvest Accessory for a Tractor Mounted Work Platform.

BACKGROUND

Orchards need to be regularly pruned in order to keep the trees in the proper condition for growing fruit (e.g., apples, peaches, etc.). Traditionally, pruning and trellis work was done on a ladder, which was laborious and very time consuming because workers had to climb down off the ladder to move from place to place within a tree and to progress from tree to tree. To cut down on the challenges of using ladders or other types of fixed scaffolding, certain elevated, mobile platforms were developed to increase pruning efficiency, such as the aerial platform apparatus disclosed in U.S. Pat. No. 3,866,713 to Carpenter et al. ("Carpenter"). However, these elevated, mobile platforms are dedicated pruning machines, which adds another piece of equipment to a farm or orchard thereby increasing costs and expense. Also, these mobile platforms have not been designed to allow for pruning of both sides of a row of trees simultaneously. Additionally, the apparatus disclosed in Carpenter requires both a pruner in the platform and an operator to move the platform to the next location. These failures make them impractical for many orchards and small farms. At least one device, shown in U.S. Pat. No. 3,534,832 to Rediske ("Rediske"), discloses a single extension boom with an aerial platform that is attached to a rear three-point hitch of a tractor that was intended for use in repairing and painting buildings with relatively high side walls. In the context of orchard maintenance, however, Rediske has several shortcomings, including: 1) significant chance of instability during use (a platform usable in orchards needs to be movable along the curvilinear path of the tree branches, which is not accounted for in Rediske's design), 2) inability to have two pruners on opposite sides of a row of trees, and 3) it includes a complex, integrated driving control system that is not readily removable from the tractor when the aerial platform is not needed.

What is needed are platforms designed for use in pruning, harvesting, and trellis work that allow the worker to perform pruning, harvesting, and trellising work in a more efficient manner.

In addition, during the harvesting of fruit, such as apples, peaches, plums, pears, and cherries, workers have to climb up and down ladders and bring harvested fruit to a bin, which is typically left in the middle of a row and to which the workers may have to walk up to 100 feet from the tree to reach. This is both difficult and time consuming for the workers and can result in more damage to the fruit due to opportunities for jostling. What is needed is a system that allows for more efficient harvesting of fruit from an orchard by workers.

SUMMARY OF THE DISCLOSURE

In an exemplary embodiment, a harvest accessory system for a tractor has a first bin area attached toward the front of the tractor, the first bin area including a horizontal member for supporting bins and a vertical member supporting the horizontal member. The system has a second bin area attached to the tractor behind the first bin area, the second bin area including a second horizontal member for supporting bins and a conveyor configured to move bins horizontally in a rearward direction and a third bin area attached to the tractor behind the second bin area. The third bin area includes a third horizontal member for supporting bins, a first vertical support attached to and extending up from the third horizontal member, a second vertical support attached to the rear of the tractor and extending down from the third horizontal member, an upper arm pivotably attached to the first vertical support and the second vertical support, a lower arm pivotably attached to the first vertical support and the second vertical support, and an actuator operably connected to the first vertical support and the second vertical support, wherein the actuator is configured to raise and lower the third horizontal member between a height of the second horizontal member and ground level.

In an exemplary embodiment, a method of handling harvest bins on a tractor includes supporting a bin on a first bin support area, wherein the first bin support area is attached to the tractor, transferring the bin from the first bin support area to a second bin support area, wherein the second bin support area is attached to the tractor and is adjacent to and distal to the first bin area, transferring the bin from the second bin support area to a third bin support area, wherein the third bin support area is attached to the tractor and is adjacent to and distal to the second bin area, and lowering the bin while the bin is supported by the third bin support area such that a portion of the bin contacts the ground.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

The present invention is directed toward a working platform sized and configured to be removably attached to a front portion of a utility tractor. The platform can be moved toward and away from the side of the tractor to which it is attached in a horizontal plane so as to allow the user to move toward and away from an object to be worked on, such as the edge of a tree to be pruned. The working platform can be sized to allow a user to move about on the platform and allows the user to control the tractor's movement from the platform.

A working platform according to the present disclosure assists pruners (people involved in the act of pruning trees) to readily access the portions of the trees that need to be pruned efficiently and safely, as well as workers to perform other tasks on trees or, trellised plants. In certain embodiments, the working platform is removably attachable to a standard utility tractor so as to maintain the proper and safe operation of the tractor. The working platform can be moved in a horizontal plane away from and toward the side of the tractor (and therefore toward, or away from, the tree to be pruned). As trees have an outer edge that is somewhat curvilinear, this movement allows a pruner to get close to a tree as the tree's outer edge moves away from the tractor body (as the tractor moves slowly down a row). In certain embodiments, the working platform also includes the necessary controls to allow the pruner to operate the tractor from the working platform. In another embodiment, the working platform includes automatic controls that assist the tractor to remain substantially between the rows of trees while progressing slowly down the rows without assistance from the pruner. These and other aspects of the present invention are discussed in more detail below.

Figure 1A:
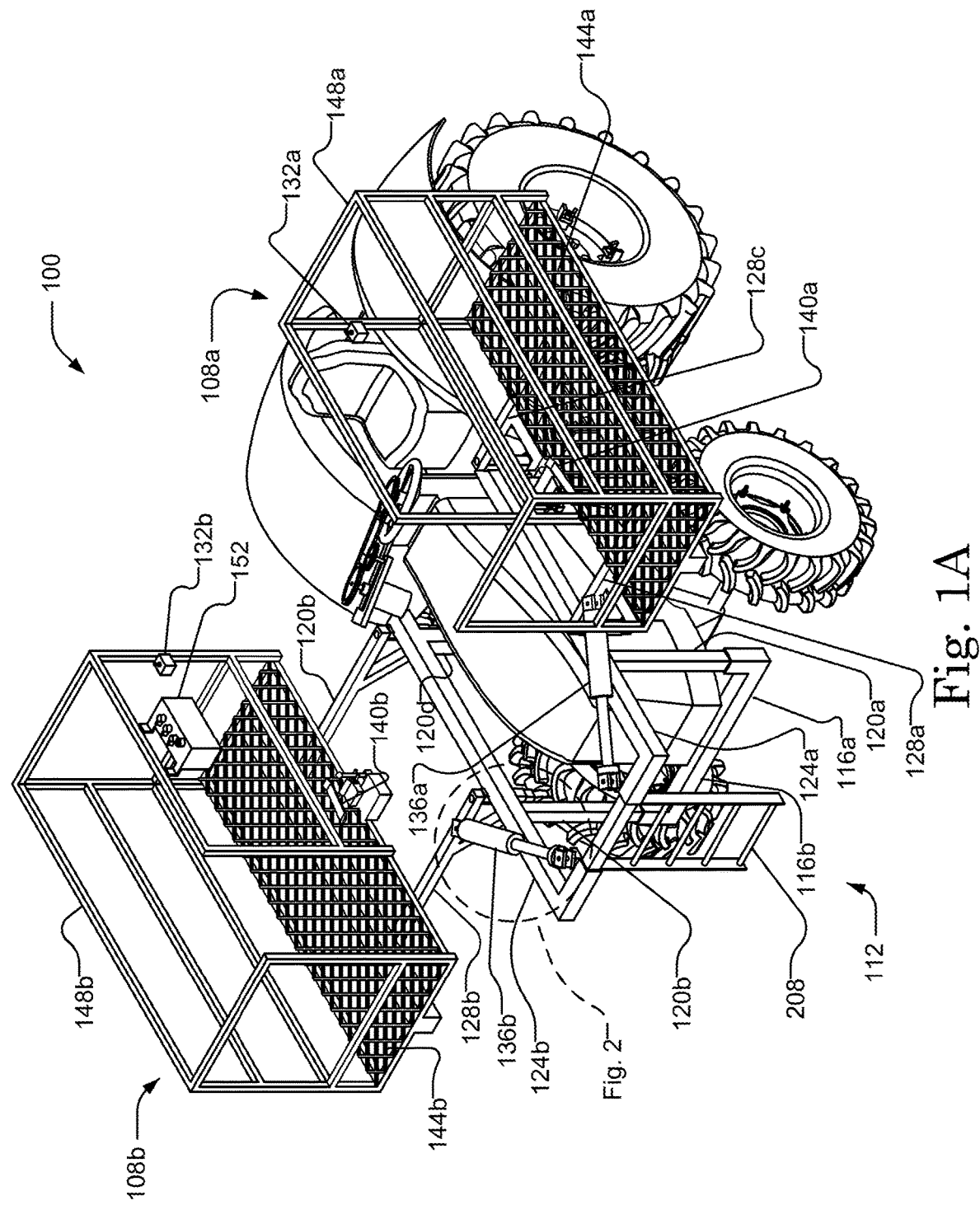
FIG. 1A is a perspective view of a tractor with attached working platforms in accordance with an embodiment of the present invention.
Figure 1B:
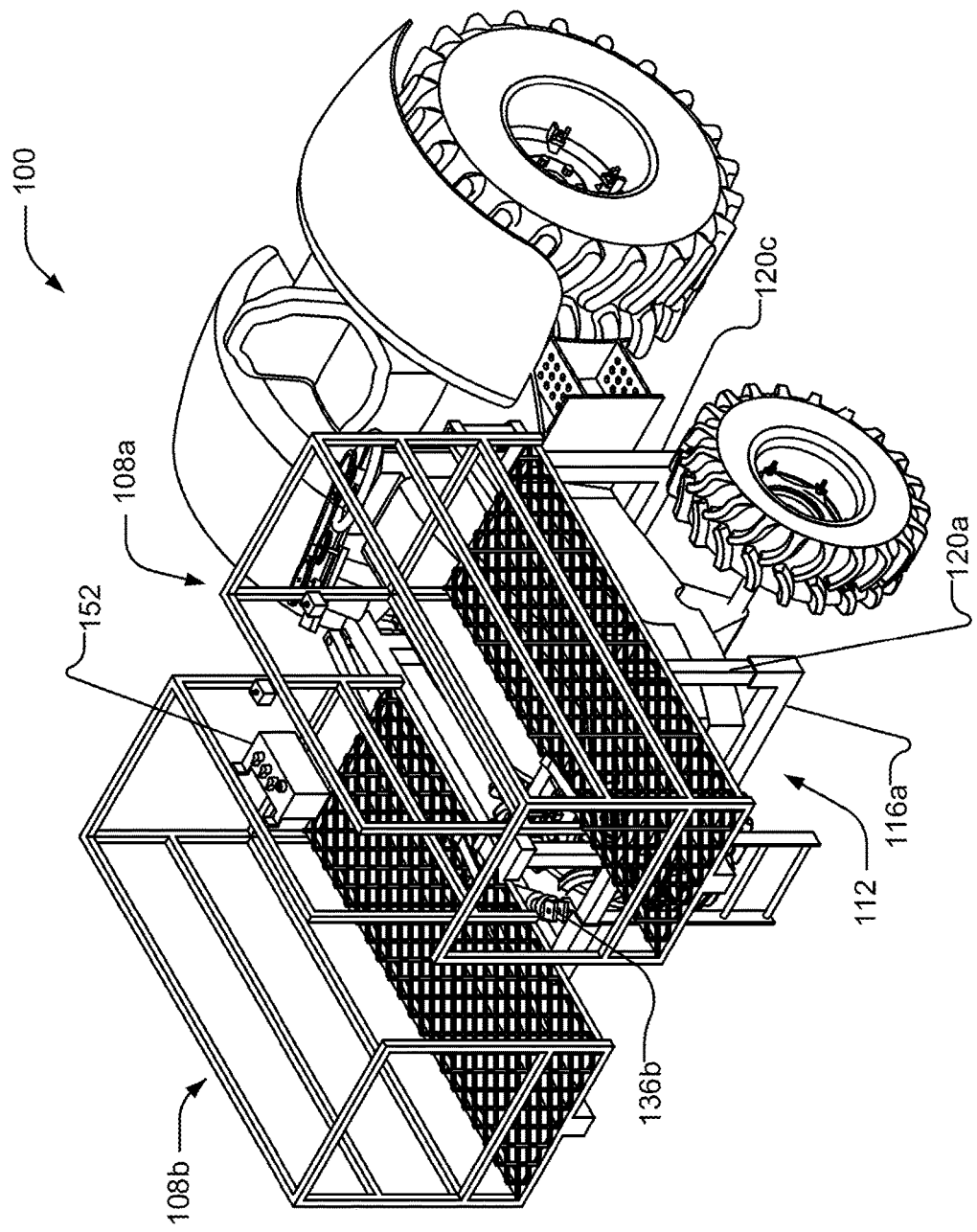
FIG. 1B is another perspective view of the tractor of FIG. 1A.
Figure 1C:
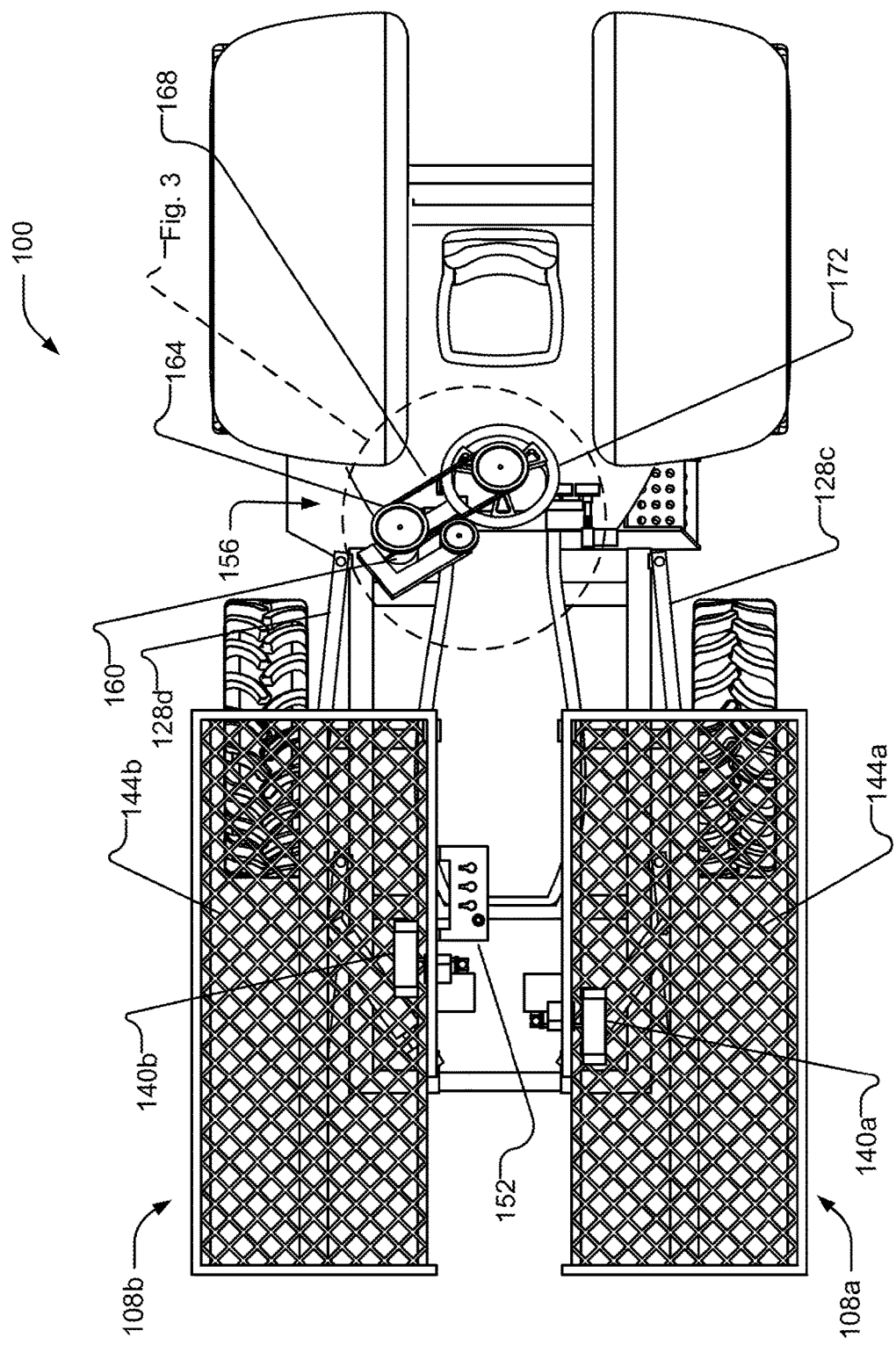
FIG. 1C is a top view of the tractor as shown in FIG. 1B.

Referring to FIGS. 1A-1C, a tractor 100 with a platform 108 (e.g., 108a and 108b) attached thereto is shown. In an exemplary embodiment, platform 108 can be used with a variety of utility tractors and can be removed from one tractor and attached to another tractor even if the tractors are not the same kind. In an exemplary embodiment, two platforms 108, platforms 108a and 108b, are removably attached to tractor 100. Platforms 108a and 108b are preferably attached to respective opposite sides of tractor 100 in order to help maintain balance in the event the platforms are exerting unbalanced forces (e.g., if one platform is fully extended and contains a worker while the second platform is empty and retracted). Preferably, platforms 108 are attached at about a middle-front portion of tractor 100. In this way, for many types of tractors, platform 108 would be generally attached approximately in line with the engine of the tractor with respect to a direction running from the front of the tractor to the back of the tractor, which further serves to help maintain balance. In addition, an air compressor (not shown) may be attached to the rear of the tractor (such as via a three-point hitch) as a counterweight if needed as well as for use for operating air-powered pruning equipment, for example.

Platform 108 may be attached to tractor 100 using any suitable technique. In an exemplary embodiment, platform 108 is attached to the tractor using a frame assembly 112. Frame assembly 112 includes frame mounts 116 (e.g., 116a-b), vertical supports 120 (e.g., 120a-d), cross-bar members 124 (e.g., 124a-b), and arms 128 (e.g., 128a-d). Frame mounts 116 are attached to the frame of tractor 100. Preferably, frame mounts 116 may be bolted or welded to the tractor frame. To each frame mount 116 a vertical support 120 is attached via bolts, for example. Vertical supports 120 may be of any desired length, but preferably of such length as to place platform 108 at an appropriate height, such as around five or six feet above the ground depending on the particular intended work to be done, when attached to tractor 100. Cross-bar members 124 are connected to vertical supports 120 on either side of the tractor 100. Cross-bar member connect platform 108 to vertical support 120.

Figure 2:
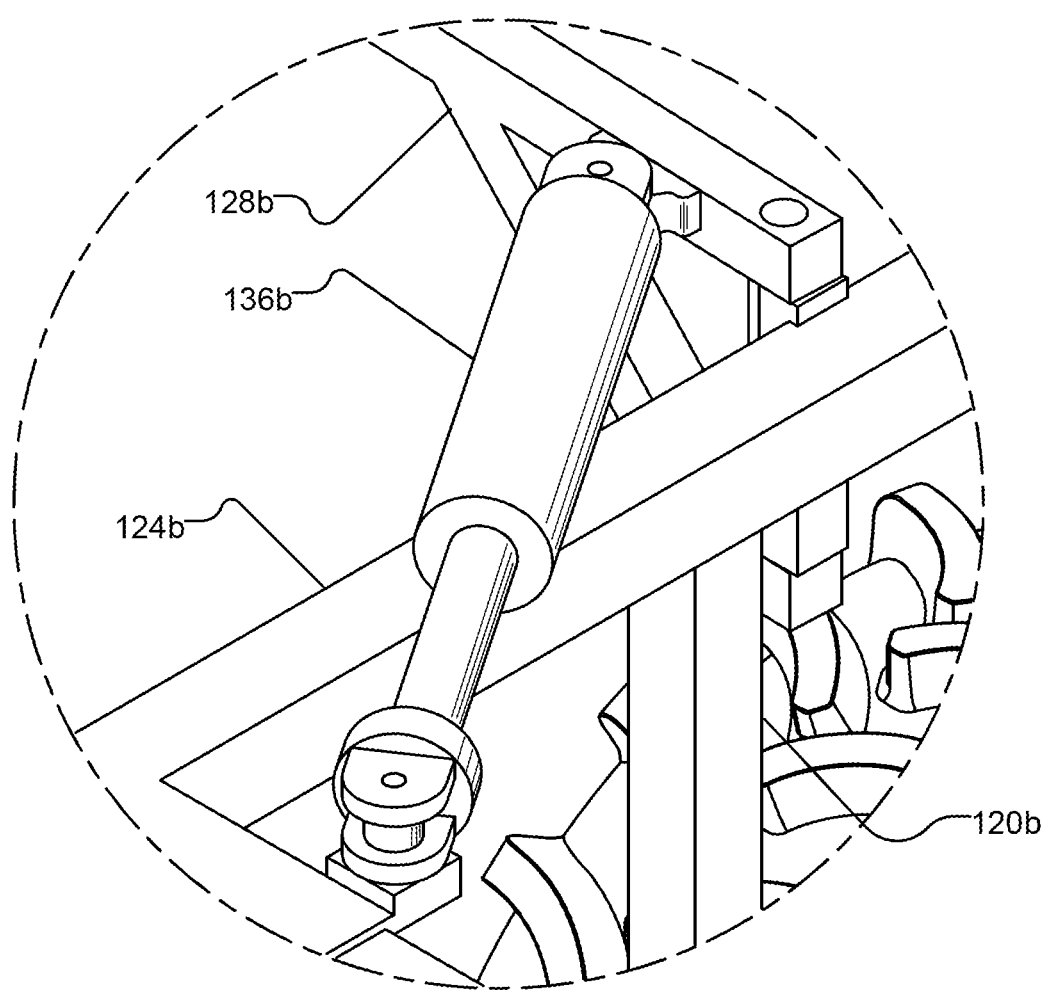
FIG. 2 is a detail view of a portion of FIG. 1A showing a hingeable arm and hydraulic cylinder.

Arms 128 are designed to support platform 108. Arms 128 may be pivotably attached to cross-bar members 124 and/or vertical supports 120. Arms 128 are pivotable in at least a horizontal plane and are preferably operably linked to a hydraulic cylinder 136 or other mechanism for moving arms 128 through the horizontal plane between a retracted position (platform 108a is shown in a retracted position in FIG. 1A) and an extended position (platform 108b is shown in an extended position in FIG. 1A). An end of hydraulic cylinder 136 may have a base on cross-bar member 124 and another end attached to arm 128, as can be seen in FIG. 2.

The pivoting action of arms 128 may be controlled by any suitable mechanism including a foot pedal 140 on platform 108 as shown in FIG. 1A, which can be connected to hydraulic cylinder 136 by hydraulic lines or other suitable operable connection. Pedal 140 allows a user to move platform 108 from the retracted position to the extended position while continuing to hold and use tools, such as pruning shears. If there are platforms on both sides of the tractor 100, each platform may be controlled separately from the other so that a worker on the right platform may, for example, have the right platform in the fully extended position while a worker on the left platform can have the left platform in the retracted position. In this way, in operation, the present invention allows work to be performed on two rows of trees, for example, while the tractor 100 moves down those rows.

Platform 108 may include decking 144 (e.g., 144*a-b*) or other suitable floor materials for supporting one or more workers as well as an appropriate railing system 148 (e.g., 148*a-b*). While each platform 108 may be any size depending on the tractor it is to be attached to and the intended work to be performed on it, about 1.5-3 feet wide and about 4-6 feet long may be preferable dimensions for attachment to typical utility tractors for use in pruning fruit trees, a size that allows a worker to move about on the platform to enable efficient work, e.g., on trees or trellises, or for there to be more than one worker on a platform.

Platform 108 may also include a control box 152 or similar for controlling functions of tractor 100, such as, but not limited to, steering, braking, on/off, forward/reverse, etc. Control box 152 may include knobs or switches that are operably connected to a brake assembly, a gear assembly, and a steering control for steering tractor 100. Each of these controls is reversibly interfaced with the tractor controls. For safety, each platform 108 is preferably equipped with a kill switch 132 (e.g., 132*a-b*).

Figure 3:
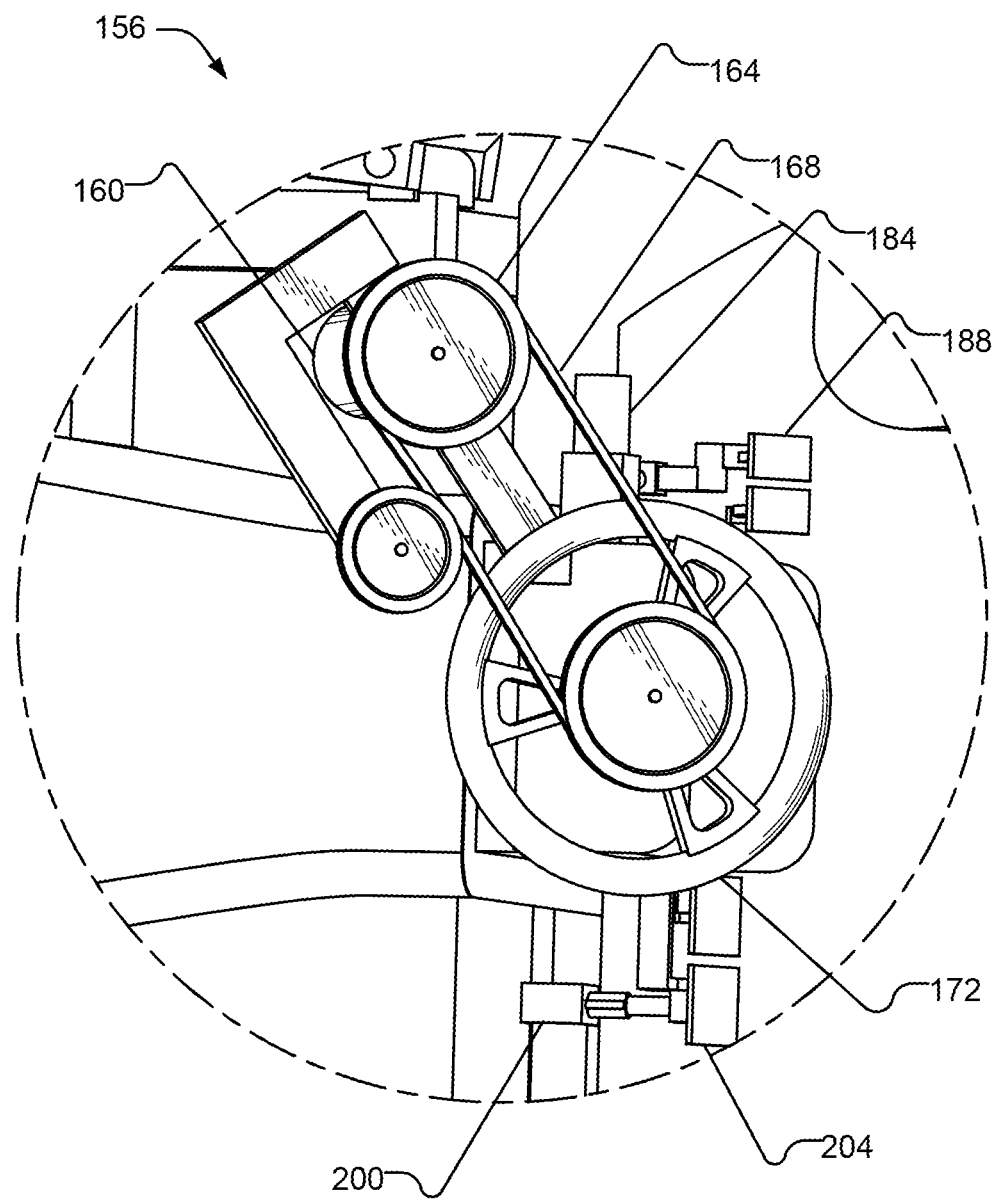
FIG. 3 is a detail view of a portion of FIG. 1C showing a portion of a tractor steering control mechanism.

FIG. 3 shows an exemplary embodiment of a steering control system 156. In this embodiment, steering control system 156 includes a motor 160, a wheel 164, and a band 168. Motor 160 is mounted on tractor 100 and connected to wheel 164. Band 168 wraps around wheel 164 and a steering wheel 172 of tractor 100. Connecting these components to control box 152 allows a user to steer tractor 100 while on remaining platform 108. When platform 108 is mounted to tractor 100 and is to be steered by a pruner, the pruner slips band 168 around wheel 164 and steering wheel 172 so as to allow for steering control of tractor 100. In another embodiment, band 168 may be connected to another wheel (not shown) that is rigidly connected to steering wheel 172.

Figure 4:
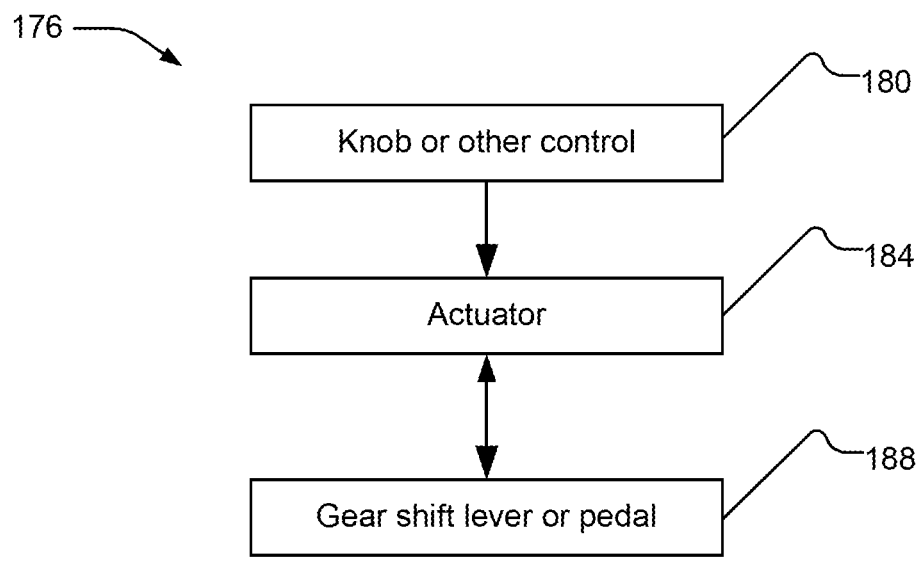
FIG. 4 is a schematic outline of a gear shift control mechanism of the present invention.

At a high level, and as outlined in FIG. 4, gear shift assembly 176 allows an operator to put tractor 100 into forward, reverse or neutral from platform 108. Gear shift assembly 176 includes a knob 180 or other mechanism for changing gears that is operably connected to an actuator 184 that is engaged with a gear shift lever 188. Actuator 184 may be reversibly attached to gear shift lever 188 via a cotter pin or other suitable mechanism depending on the type of gear shift lever. In operation, a pruner can change the operating gear of the tractor by moving knob 180 so as to change gears.

Figure 5:
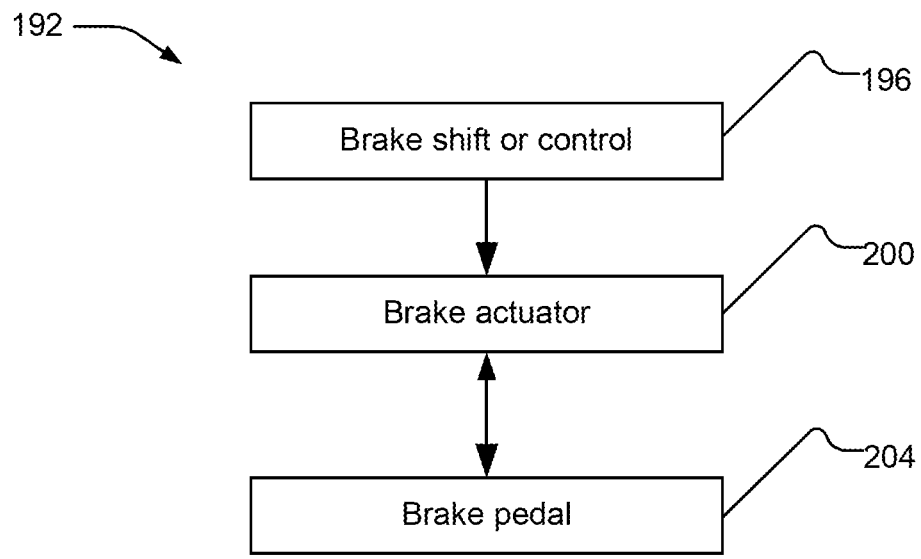
FIG. 5 is a schematic outline of a brake control mechanism of the present invention.

Brake assembly 192, as outlined in FIG. 5, includes a brake shift 196, which is operably connected to a brake actuator 200 that is engaged with a brake pedal 204 on tractor 100. Brake actuator 200 may be reversibly attached to brake pedal 204 via a cotter pin or other suitable mechanism. Brake actuator 200 may include a motor and an extendable shaft that when extended is operably connected to brake pedal 204 such that the brakes of tractor 100 are engaged.

A ladder 208 may be included to facilitate getting into platform 108. Ladder 208 may be attached near a front of the tractor 100 between platforms 108*a* and 108*b* and can be secured to, for example, vertical supports 120 and/or crossbar members 124.

In an exemplary embodiment, tractor 100 can include an automatic steering system so that tractor 100 may be kept near the center of two rows of trees in an orchard, for example. The automatic steering assembly can make steering corrections to tractor 100 as the tractor moves along between the rows or so that the tractor maintains a predetermined route or directional heading. In an exemplary embodiment, automatic steering system may use a GPS to either guide the tractor along a predetermined route or maintain the tractor along a directional heading that is entered into the GPS (either a heading may be programmed or the system can determine the desired heading after a certain distance between rows has been traveled by the tractor while being manually steered).

Figure 6:
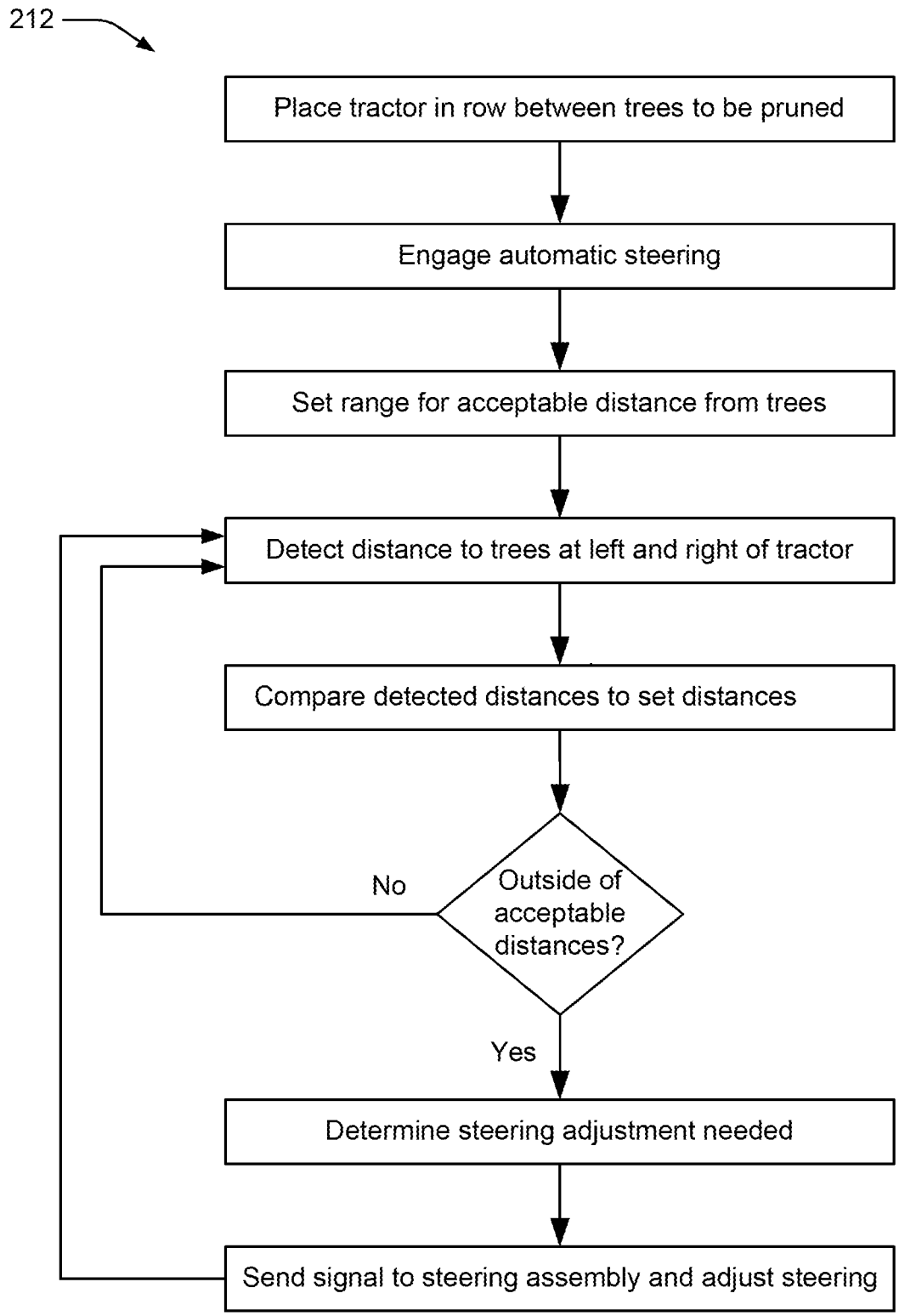
FIG. 6 is a flowchart of an automatic steering system of an embodiment of the present invention.

Alternatively, an automatic detection-based steering system 212, outlined in FIG. 6, may include a detection mechanism, such as a photoelectric eye or an ultrasound detector. Such detectors can determine a distance the tractor is from a row or rows of trees as the tractor travels between rows of trees. In this embodiment, automatic steering system 212 is set with a distance range that tractor 100 should maintain from a row of trees. When detector mechanism senses that tractor 100 has deviated from that range, i.e., either gotten too far or too close to a row of trees, a corrective steering operation is performed automatically. As platform 108 is laterally movable by the pruner, the ability of tractor 100 to maintain an approximate heading allows the pruner to focus on adjusting the platform instead of concerning themselves with adjusting the tractor position.

Automatic steering system 212 can include a first sensor and a second sensor attached to tractor 100 that transmit and receive ranging signals. The ranging signals can be directed toward a row of trees, a crop row, or a furrow on both sides of the tractor. The ranging signals strike the row, such as, in particular, the trunks of fruits trees along the row, or furrow and are reflected back toward the sensor. A processor can then combine and compare the ranging data in order to determine lateral displacement of the tractor with respect to the rows or the center of the rows. Any displacement or deviation is converted into corrective steering commands. The corrective steering commands are translated into motor operations for the motor that is operably connected to the steering wheel, which is thus adjusted to cause the tractor to be directed back toward the center of the rows.

A DC motor can be used to control the steering of tractor 100. When the automatic steering feature is engaged, control of steering is switched from control box 152 to the automatic steering system, which allows the GPS or detection system to steer wheel 164 based on feedback received (either via satellite data or sensors). When manual steering is required for any reason, control of tractor 100 can be switched back to control box 152 by a pruner on platform 108*b*. While various levels of precision are possible depending on the type and quality of system used, any automatic steering system used will preferably keep the tractor within about three feet or so of a desired course, which would allow workers to continue working because of the ability to adjust the horizontal position of platform 108.

Figure 7:
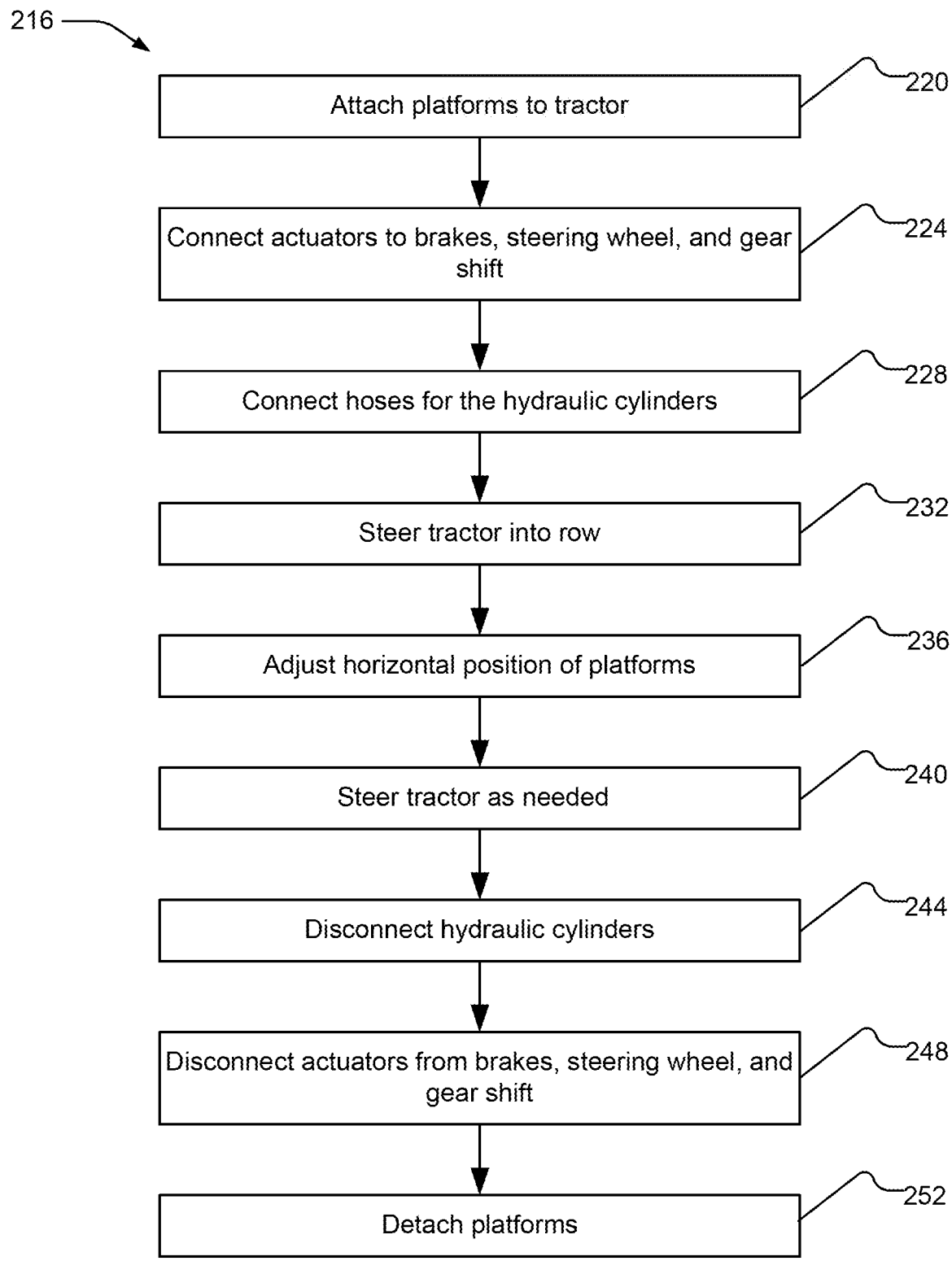
FIG. 7 is a flow chart of an exemplary attachment and detachment procedure for the working platforms of the present invention.

FIG. 7 is a flowchart 216 that outlines steps for using the working platforms with a utility tractor to work in an orchard or similar location. At step 220, the working platforms are attached to the utility tractor. Then, at step 224, actuators are connected to the brakes, the steering wheel, and the gear shift of the tractor. Next, hoses for the hydraulic cylinders are connected at step 228, at which point the tractor can be steered into a row of an orchard at step 232. Work can be performed on trees on either side of the row and adjustments are made to the horizontal positioning of the platforms at step 236 as needed for the work being performed. At the same time, the tractor may be steered by making adjustments at step 240, which may be either automatically executed or manually, or both. In this way, the platforms can be tracked along the curvilinear path of the orchard trees while the tractor continues down the row. When the working platforms are no longer needed, they can be removed by disconnecting the hydraulic cylinders at step 244 and disconnecting actuators from the brakes, the steering wheel, and the gear shift at step 248. The working platforms can then be detached from the tractor at step 252.

Figure 8:
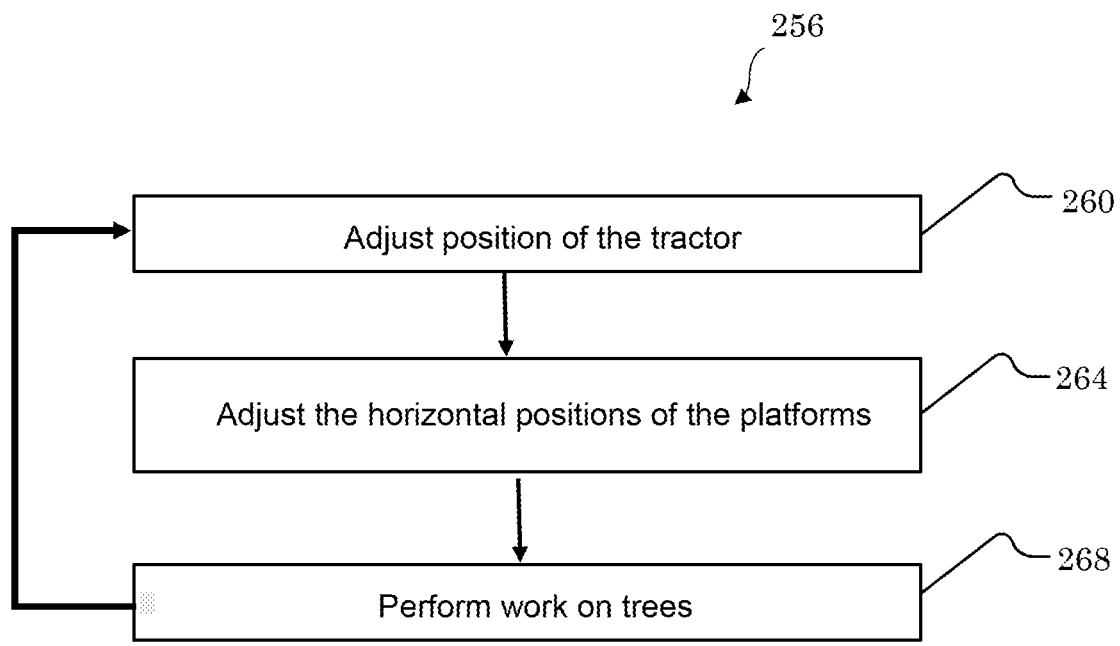
FIG. 8 is a flow chart of an exemplary procedure for operating a tractor with working platforms of the present invention.
Figure 9:
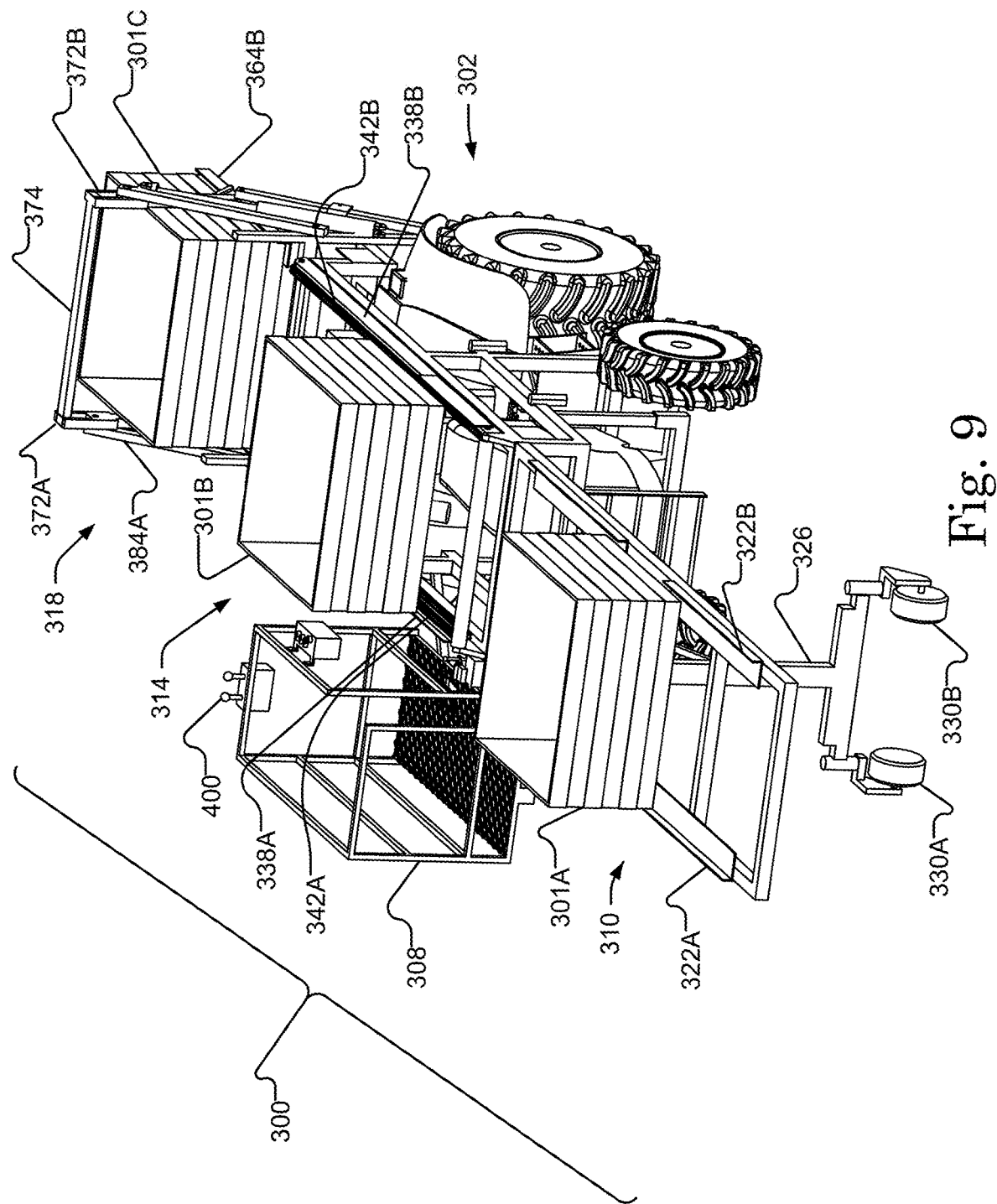
FIG. 9 is a perspective view of a tractor with a harvesting accessory attached and supporting bins in accordance with an embodiment of the present invention with one working platform also attached.
Figure 10:
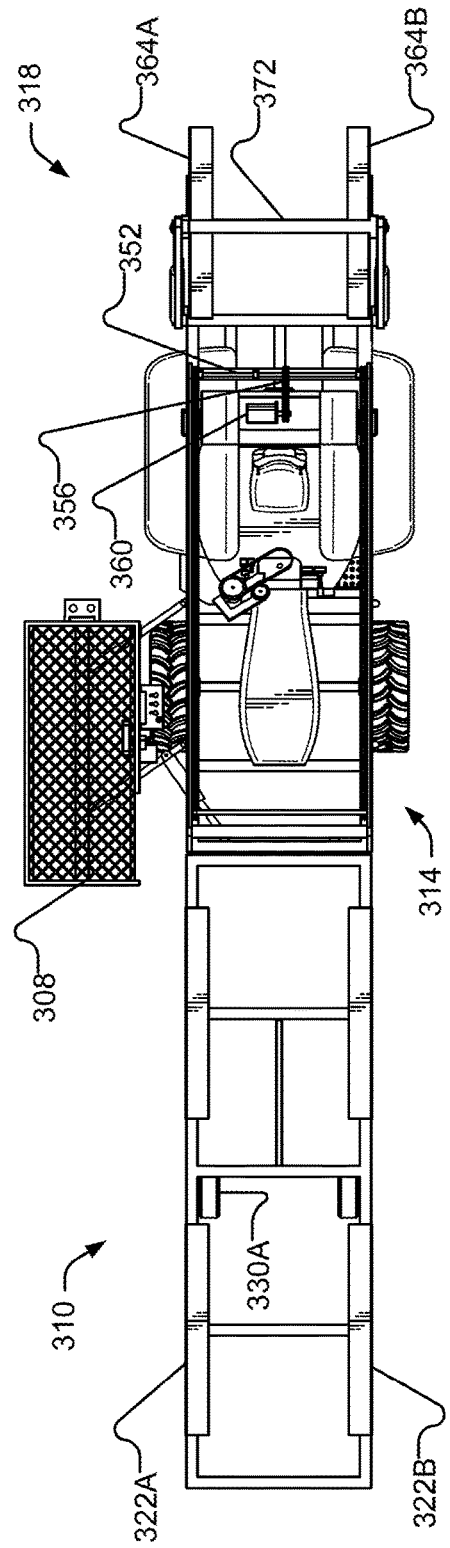
FIG. 10 is a top view of a tractor with a harvesting accessory attached without bins in accordance with an embodiment of the present invention.
Figure 11:
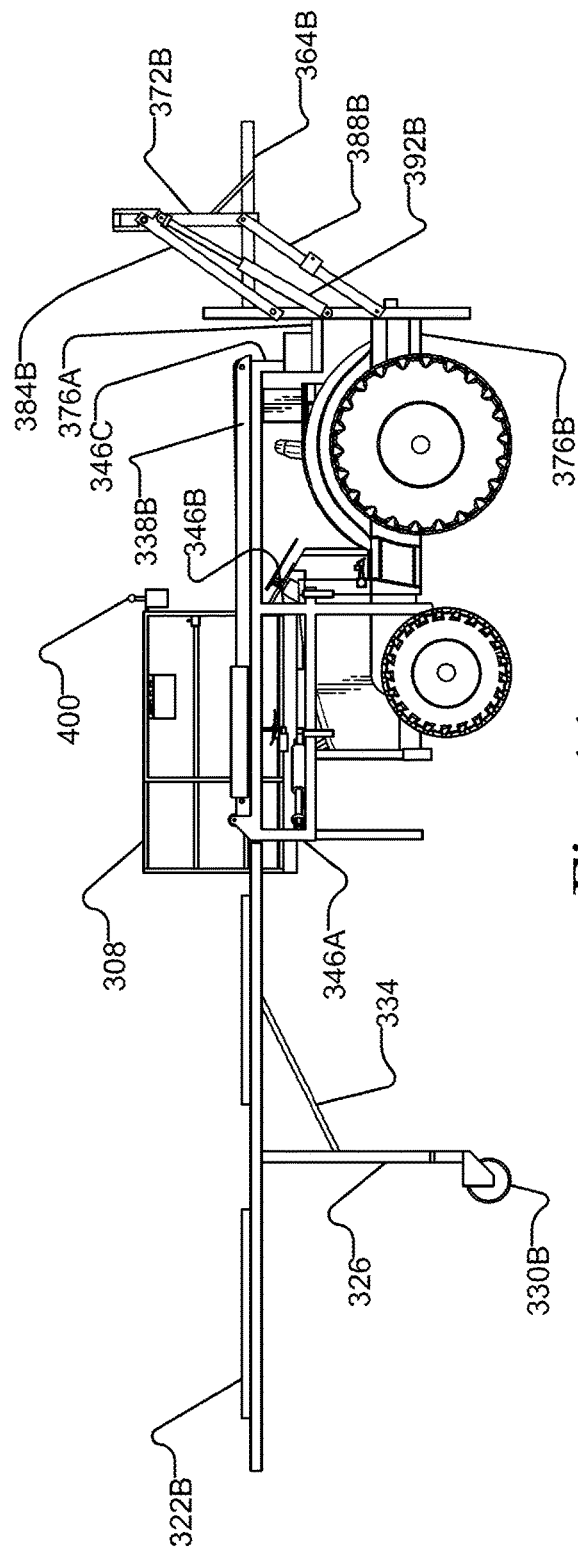
FIG. 11 is a side view of the tractor with the attached harvesting accessory of FIG. 10.
Figure 12:
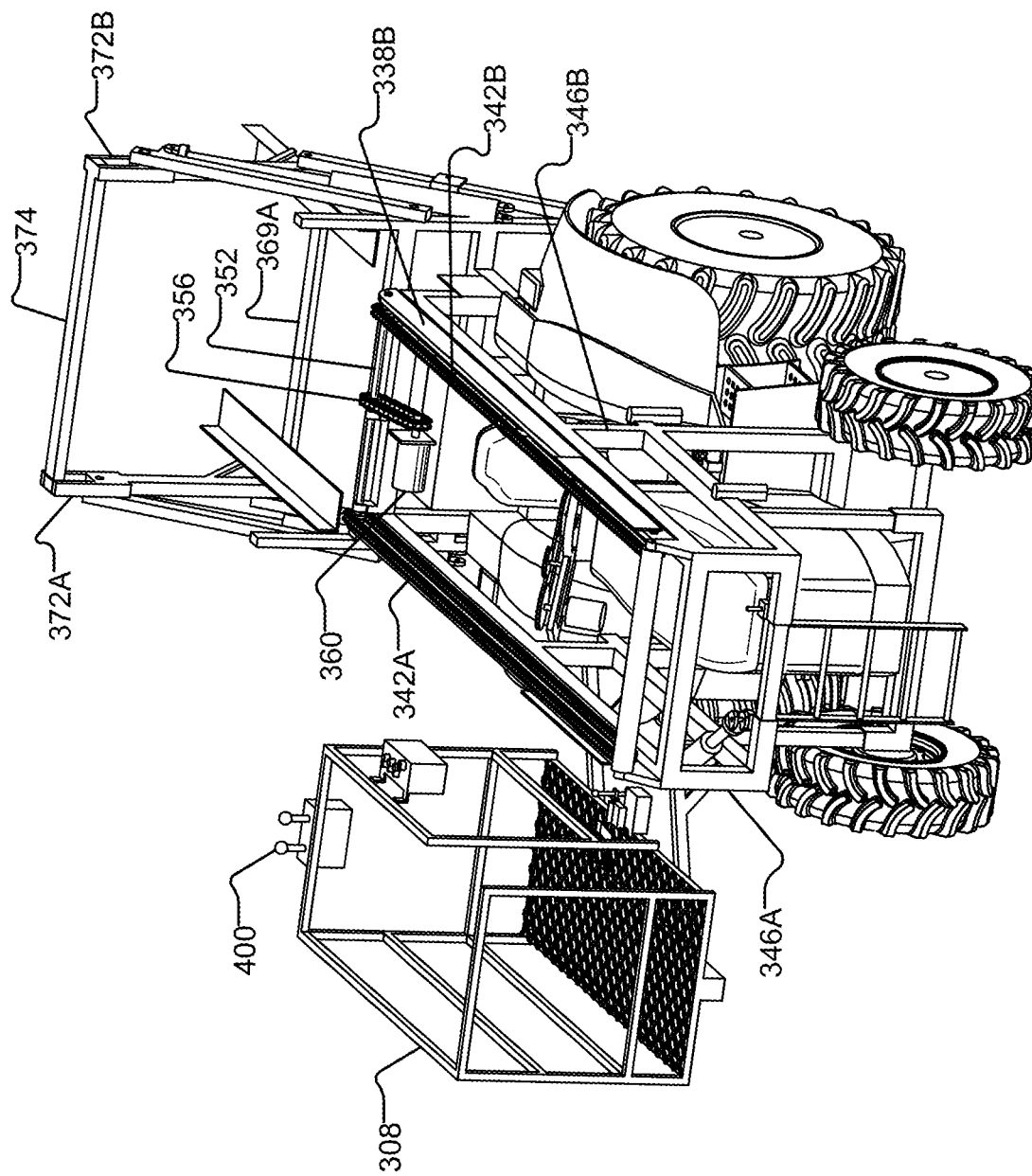
FIG. 12 is a perspective view of a harvesting accessory attached to a tractor with one working platform also attached, no bins shown, and no forward bin area shown for clarity in accordance with an embodiment of the present invention.
Figure 13A:
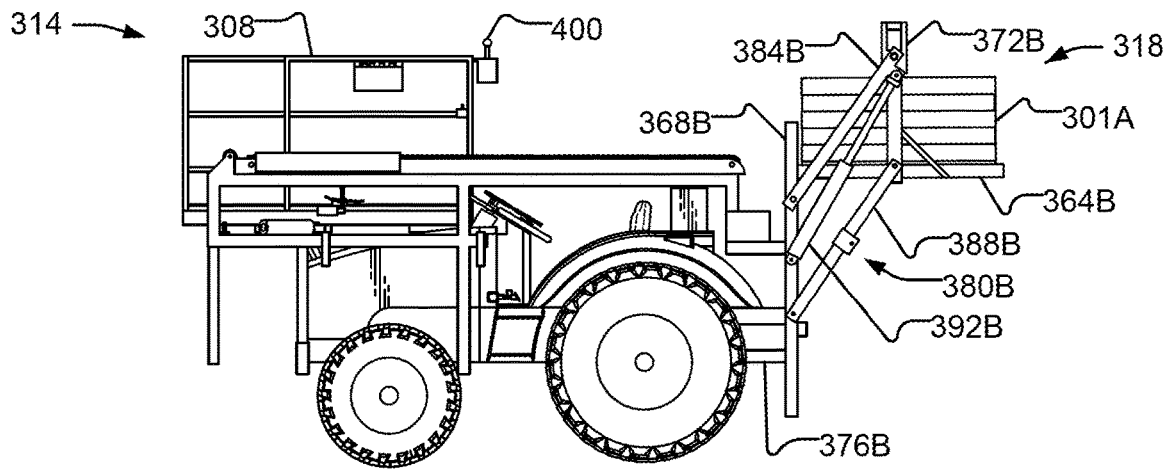
FIG. 13A is a side view of the tractor shown in FIG. 12 in which a bin is supported by the rear bin area in an elevated position.
Figure 13B:
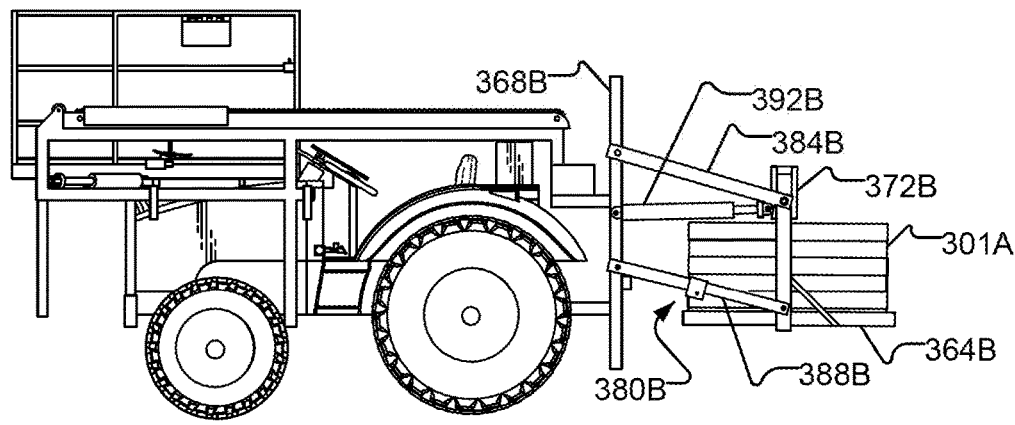
FIG. 13B is a side view of the tractor shown in FIG. 12 in which the bin is supported by the rear bin area in an intermediate position.
Figure 13C:
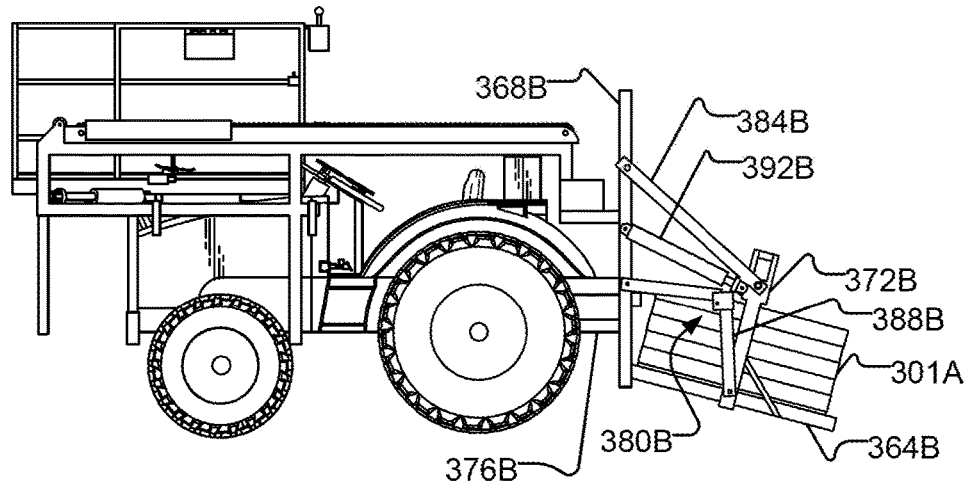
FIG. 13C is a side view of the tractor shown in FIG. 12 in which the bin is supported by the rear bin area in a lowered position.
Figure 14:
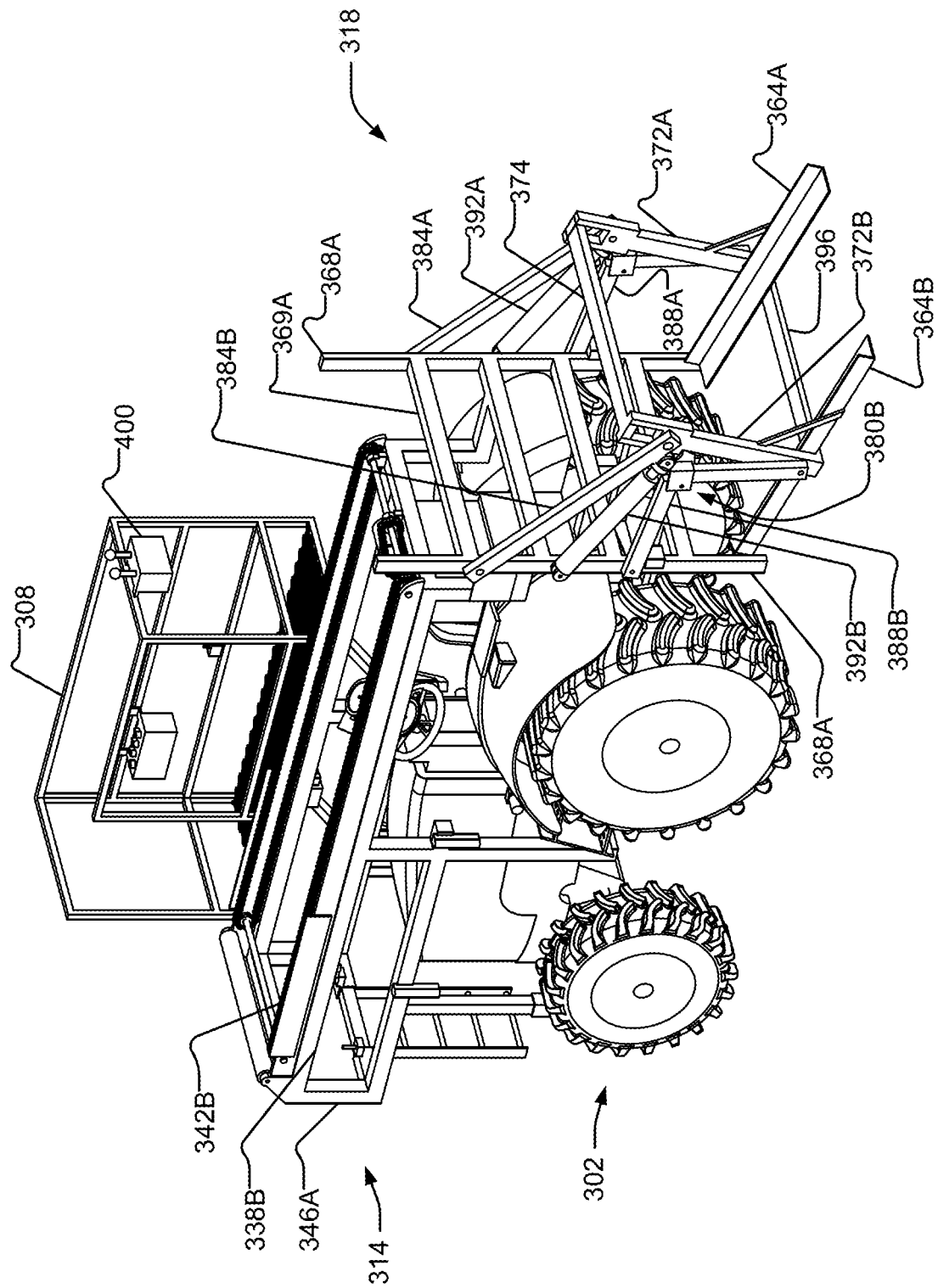
FIG. 14 is a perspective of the tractor of FIG. 12 in which the rear bin area is shown without a bin in the lowered position.

In operation, a process 256 for pruning or harvesting fruit trees, for example, as outlined in FIG. 8, allows for increased efficiency of work performed on the trees. A tractor is initially positioned between rows of the trees that are to be worked on. Once between the rows, the location of the tractor along the rows is adjusted at step 260. Adjusting the location may be accomplished by manually driving the tractor, either from one of the working platforms via control systems described herein or from the standard tractor controls, or automatically via one of the systems described above, namely a GPS position control system or a sensor-based steering system. In a preferred embodiment, the tractor position is maintained in the center of the space between rows automatically while the tractor progresses continuously down the rows, i.e., the tractor moves slowly down the rows as work on the trees occurs. As the tractor moves slowly down the row (or, in an alternative embodiment, when the tractor is stopped proximate trees on either side of the row to be worked on), the horizontal positions of the working platforms are adjusted at step 264. This allows each platform to be located at an appropriate position with respect to the tree, or more specifically, to the branches of the tree, to be pruned or harvested; i.e., it is beneficial to adjust the horizontal positions of the platforms to comport with the curvilinear shape created by the plurality of branches of a tree. With the platforms in appropriate positions, work, such as pruning or harvesting, is performed on the trees at step 268. As that work is occurring, or after that work is completed, the position of the tractor is adjusted again at step 260 so that the tractor progresses down the row, at which point the horizontal positions of the platforms may need to be adjusted again based on the branches that are now in line with the platforms. This process 256 can thus continuously proceed until work on entire rows of trees is completed.

In another embodiment, a harvest system is attached to a tractor that may also include a pair of working platforms as described above. For example, a tractor accessory harvest system 300 is shown in FIGS. 9-14. Harvest system 300 includes three bin areas, a forward bin area 310, a middle bin area 314, and a rear bin area 318. Forward bin area 310 is generally positioned in front of a tractor 302 and supports bins 301 (e.g., 301A-301C), which may be loaded onto forward bin area 310 by a forklift or other appropriate way. Forward bin area 310 includes one or more bin support members 322 (e.g., 322A, 322B) that support the bins. Forward bin area 310 also includes a vertical support 326, which is preferably connected at the bottom to one or more wheels 330 (e.g., 330A, 330B) so that tractor 302 may continue to move when harvest system 300 is attached. In addition, a support member 334 (as can best be seen in FIG. 11) may be included between vertical support 326 and bin support members 322. Forward bin area 310 is attached to tractor 302 such that bin support member 322 is substantially aligned with middle bin area 314 such that bins 301 from forward bin area 310 may be slid onto middle bin area 314. In particular, middle bin area 314 includes one or more middle bin area horizontal support members 338 (e.g., 338A, 338B), which support bins that are being filled with produce by harvest workers and which are at approximately the same level as forward bin support members 322.

Middle bin area 314 also includes a conveyor system, such as conveyor belts 342 (e.g., 342A, 342B), which run in a front to back direction with respect to tractor 302. As can best seen in FIGS. 10 and 12, conveyor belts 342 are connected to a rod 352, which is operable connected to a chain 356 or other suitable mechanism that can turn rod 352. Chain 356 is also connected to a motor 360 or other movement mechanism to provide the drive for the conveyor system. Middle bin area horizontal support members 338 are supported by and secured to tractor 302 by a plurality of middle vertical supports 346 (e.g., 346A-346C).

Substantially aligned with and to the rear of middle bin area 314 is rear bin area 318, which includes one or more rear area horizontal bin supports 364 (e.g., 364A, 364B). Rear area horizontal bin supports 364 accept full bins that are conveyed onto them from middle bin area 314 via the conveyor mechanism. Upper vertical members 372 (e.g., 372A, 372B) extend up from rear area horizontal bin supports 364 and preferably include a crossbar 374. Another crossbar 396 may be included connecting rear area horizontal bin supports 364. Each upper vertical member 372 is attached to a first end of an upper arm 384 (e.g., 384A, 384B) and a first end of a lower arm 388 (e.g., 388A, 388B), as well as a first end of a hydraulic arm 392 (e.g., 392A, 392B) or similar mechanism. A second end of upper arm 384 is attached to a rear bin vertical support 368 (e.g., 368A, 368B), as are a second end of lower arm 388 and a second end of hydraulic arm 392. Each vertical support 368 is attached to one or more crossbars 369 (e.g., 369A) and is secured to tractor 302 via one or more rear area horizontal support members 376 (e.g., 376A, 376B).

Lower arm 388 preferably includes an elbow connection 380 (e.g., 380A, 380B) between the first end and the second end of lower arm 388. When a bin on middle bin area 314 (which is adjacent to working platform 308 when one or two working platforms are also attached to tractor 302) is filled with produce, an operator on a working platform 308 uses control panel 400 to activate conveyor belts 342. (It is noted that the figures are shown with one working platform for clarity, but that typically two working platforms will be used, one on each side of middle bin area 314). The full bin is in this way transferred to rear bin area 318, where it is supported by rear area horizontal bin supports 364. The operator then uses control panel 400 to activate hydraulic arms 392, which causes rear area horizontal bin supports 364 to begin lowering. Upper arms 384 and lower arms 388 pivot about respective attachment points on rear bin vertical supports 368 and upper vertical members 372 in such a manner as to maintain rear area horizontal bin supports 364 sufficiently horizontal to prevent bin from sliding off until rear area horizontal bin supports 364 reach or become near ground level (as shown sequentially in FIGS. 13A-13C.) This motion may be facilitated by the inclusion of elbow connection 380 in lower arms 388 that are configured to release (i.e., form an angle downward) at an appropriate height so that the bin tilts downward and slowly slides off of rear area horizontal bin supports 364 as tractor 302 moves forward.

Figure 15:
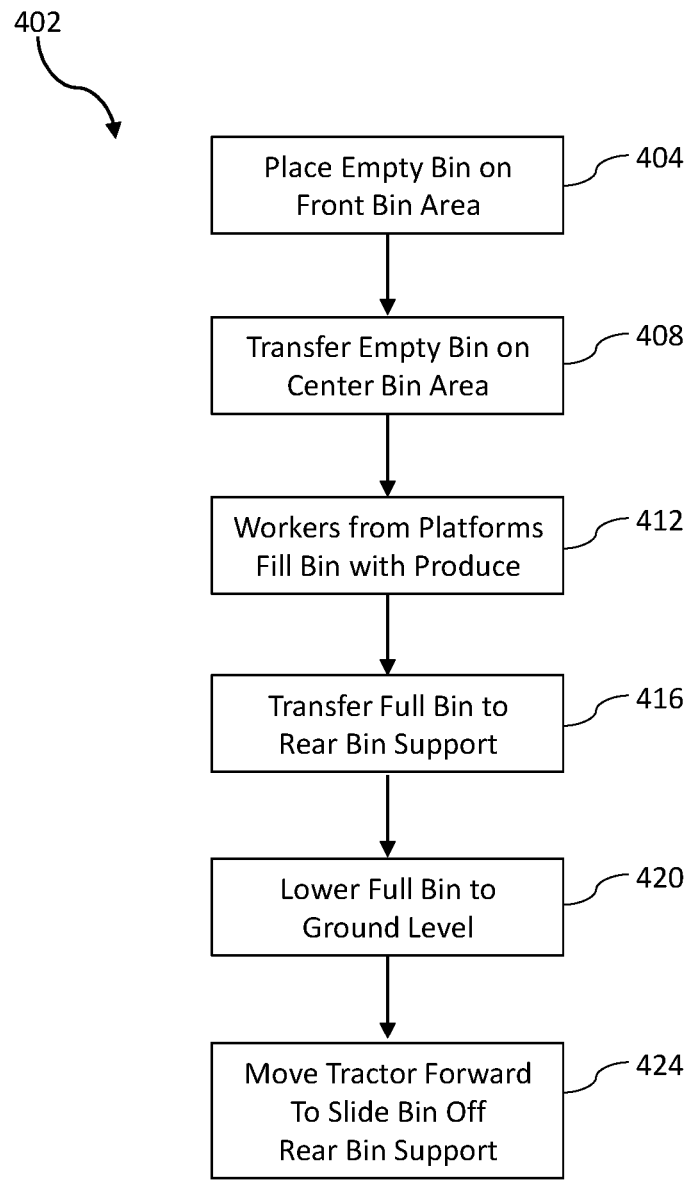
FIG. 15 outlines the steps involved in transferring and filling bins during a harvesting operation in accordance to an embodiment of the present invention.

As outlined in FIG. 15, a process 402 for facilitating the harvest of produce involves one or more empty bins being placed at step 404 on the forward bin area of a tractor, and harvest workers occupy the working platforms. Workers pull an empty bin from the forward bin area to the middle bin area at step 408 and harvest produce from the working platforms as the tractor moves slowly down an orchard row. The workers can place produce in the bin on the middle bin area from the working platforms during step 412, which saves considerable time and effort. When a bin is filled, a worker can engage the conveyor system from the working platform to move the full bin from the middle bin area to the rear bin area at step 416, where the full bin can be lowered to ground level via the hydraulic arms at step 420. Then an empty bin can be pulled from the front bin area (as noted, empty bins may be replenished on the front bin area by a forklift or similar), and the full bin is deposited along the rows for pick up as the tractor slowly pulls forward at step 424, causing the full bin to gently slide off the rear bin area on to the ground. In addition to saving harvest workers time and effort, the harvesting system described herein results in less jostling, and thus bruising, of harvested produce from plant to bin.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A harvest accessory system for a tractor having a front and a rear, the system comprising:
    a first bin area attached toward the front of the tractor, the first bin area including a horizontal member for supporting bins and a vertical member supporting the horizontal member;
    a second bin area attached to the tractor behind the first bin area, the second bin area including a second horizontal member for supporting bins and a conveyor configured to move bins horizontally in a rearward direction; and
    a third bin area attached to the tractor behind the second bin area, the third bin area including:
        a third horizontal member for supporting bins;
        a first vertical support attached to and extending up from the third horizontal member;
        a second vertical support attached to the rear of the tractor and extending down from the third horizontal member;
        an upper arm pivotably attached to the first vertical support and the second vertical support;
        a lower arm pivotably attached to the first vertical support and the second vertical support; and
        an actuator operably connected to the first vertical support and the second vertical support, wherein the actuator is configured to raise and lower the third horizontal member between a height of the second horizontal member and ground level,
        wherein the lower arm includes two hingeably connected sections.

2. The harvest accessory system of claim 1, further including a first working platform attached to the tractor adjacent to the second bin area, the first working platform including:
    a platform configured to be adjusted horizontally toward and away from the tractor and wherein the platform is sized to allow more than one worker to be on the platform; and
    a control mechanism on the platform operably connected to steering, braking, and gear shifting functions of the tractor so as to allow for maneuvering the tractor from the platform.

3. The harvest accessory system of claim 2, further including a second working platform attached to the tractor adjacent to the second bin area, wherein the second platform is opposite the first working platform.

4. The harvest accessory system of claim 2, wherein the control mechanism is operably connected to the actuator.

5. The harvest accessory system of claim 2, wherein the control mechanism further controls the conveyor.

6. The harvest accessory of claim 1, wherein a wheel is attached to the vertical member of the first bin area such that the wheel engages with the ground when the first bin area is attached to the tractor.

7. A method of handling harvest bins on a tractor comprising:
    supporting a bin on a first bin support area, wherein the first bin support area is attached to the tractor;
    transferring the bin from the first bin support area to a second bin support area, wherein the second bin support area is attached to the tractor and is adjacent to and distal to the first bin area;
    transferring the bin from the second bin support area to a third bin support area, wherein the third bin support area is attached to the tractor and is adjacent to and distal to the second bin area;
    lowering the bin while the bin is supported by the third bin support area such that a portion of the bin contacts the ground; and
    transferring the bin from the third bin support area to the ground after the portion of the bin contacts the ground by moving the tractor forward.

8. The method of handling harvest bins of claim 7, wherein transferring the bin from the second bin support area to the third bin support area includes activating a conveyor system.

9. The method of handling harvest bins of claim 8, wherein lowering the bin to ground level is controlled from a controller located on a working platform attached to the tractor.

10. The method of handling harvest bins of claim 8, wherein activating the conveyor system is controlled from the controller.

11. The method of handling harvest bins of claim 7, wherein lowering the bin to ground level includes activating a hydraulic arm.

\* \* \* \* \*